United States Patent
Shibuya

(10) Patent No.: US 11,030,423 B2
(45) Date of Patent: Jun. 8, 2021

(54) ANALYSIS DEVICE, PROGRAM FOR AN ANALYSIS DEVICE AND ANALYSIS METHOD

(71) Applicant: HORIBA, LTD., Kyoto (JP)

(72) Inventor: Kyoji Shibuya, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 16/724,306

(22) Filed: Dec. 22, 2019

(65) Prior Publication Data
US 2020/0210651 A1 Jul. 2, 2020

(30) Foreign Application Priority Data

Dec. 26, 2018 (JP) .............................. JP2018-242183

(51) Int. Cl.
*G06G 7/24* (2006.01)
*G01N 21/31* (2006.01)
*G01N 21/27* (2006.01)

(52) U.S. Cl.
CPC .............. *G06G 7/24* (2013.01); *G01N 21/27* (2013.01); *G01N 21/3103* (2013.01)

(58) Field of Classification Search
CPC ....... G06G 7/24; G01N 21/27; G01N 21/3103
See application file for complete search history.

(56) References Cited

U.S. PATENT DOCUMENTS

2003/0160173 A1* 8/2003 Ershov ................... G01N 21/39
                                                            250/338.5
2008/0225273 A1 9/2008 Ershov et al.
(Continued)

FOREIGN PATENT DOCUMENTS

EP  3336522 A1  6/2018
JP  2007-101186 A  4/2007
(Continued)

OTHER PUBLICATIONS

"Detection of Ammonia Using Logarithmic-Transformed Wavelength Modulation Spectrum", IOP Conference Series: Materials Science and Engineering, Aug. 16, 2008, by Menglong Cong etal (hereinafter Menglong). (Year: 2008).*
(Continued)

*Primary Examiner* — Jamil Ahmed
(74) *Attorney, Agent, or Firm* — Brooks Kushman P.C.

(57) ABSTRACT

The present invention enables an analysis device that utilizes light absorption to measure concentrations of target components by means of a simple calculation, and without any complex spectrum calculation processing being required, and analyzes target components that are contained in a sample, and is provided with a light source that emits modulated light whose wavelength is modulated relative to a central wavelength using a predetermined modulation frequency, a photodetector that detects an intensity of sample light obtained when the modulated light is transmitted through the sample, a correlation value calculation unit that calculates correlation values between intensity-related signals that are related to the intensity of the sample light, and predetermined feature signals, and a concentration calculation unit that calculates concentrations of the target components using the correlation values obtained by the correlation value calculation unit.

13 Claims, 13 Drawing Sheets

(56) References Cited

U.S. PATENT DOCUMENTS

2012/0273681 A1 11/2012 Schulkin et al.
2017/0138846 A1* 5/2017 Alizadeh .............. G01N 21/274

FOREIGN PATENT DOCUMENTS

| JP | 2008-064688 A | 3/2008 |
| JP | 2009-047677 A | 3/2009 |
| JP | 2016-080403 A | 5/2016 |
| JP | 2016-090521 A | 5/2016 |
| JP | 2018-096974 A | 6/2018 |
| JP | 2019-066477 A | 4/2019 |

OTHER PUBLICATIONS

EESR dated May 26, 2020 issued for European Patent Application No. 19218596.5, 9 pgs.
Menglong Cong et al., "Detection of NH 3 using logarithmic-transformed wavelength modulation spectroscopy", Proceedings of SPIE, Oct. and Nov. 2016, vol. 10255, pp. 102552L-1-102552L-6.
Office Action dated Jan. 12, 2021 issued for Japanese Patent Application No. 2019-230176, 8 pgs.

* cited by examiner

ANALYSIS DEVICE, PROGRAM FOR AN ANALYSIS DEVICE AND ANALYSIS METHOD

CROSS-REFERENCE TO RELATED APPLICATION

This application claims priority to Japanese Application No. 2018-242183, filed Dec. 26, 2018, the disclosure of which is incorporated in its entirety by reference herein.

TECHNICAL FIELD

The present invention relates to an analysis device and the like that are used, for example, for gas component analysis and the like.

TECHNICAL BACKGROUND

Conventionally, as is shown in Patent Document 1, an analysis method (TDLAS: Tunable Diode Laser Absorption Spectroscopy) exists in which concentration determination is performed by modulating an injection current of a semiconductor laser so as to sweep an oscillation wavelength, and thereby obtain an absorption spectrum of a gas being measured.

DOCUMENTS OF THE PRIOR ART

Patent Documents

[Patent document 1] Japanese Unexamined Patent Application (JP-A) No. 2016-90521

DISCLOSURE OF THE INVENTION

Problems to be Solved by the Invention

However, in normal TDLAS, in order to perform concentration determination from an absorption signal obtained by means of wavelength sweeping, after having firstly converted a time axis of the absorption signal into a wavelength axis so as to create an absorption spectrum, it is then necessary to perform complex spectrum calculation processing such as spectrum fitting, baseline estimation, and multivariate analysis and the like. As a result, a sophisticated calculation processing device is necessary, and this leads to increases in both the cost and the size of the analysis device.

The present invention was therefore conceived in order to solve the above-described problems, and it is a principal object thereof to enable an analysis device that utilizes light absorption to measure concentrations of target components by means of a simple calculation, and without any complex spectrum calculation processing being required.

Means for Solving the Problem

In other words, an analysis device according to the present invention is an analysis device that analyzes target components which are contained in a sample, and that includes a light source that emits modulated light whose wavelength is modulated using a predetermined modulation frequency, a photodetector that detects an intensity of sample light obtained when the modulated light is transmitted through the sample, a correlation value calculation unit that calculates correlation values between intensity-related signals that are related to the intensity of the sample light, and predetermined feature signals, and a concentration calculation unit that calculates a concentration of the target component using the correlation values obtained by the correlation value calculation unit. Note that, in the present invention, the calculation of the correlation values includes not only obtaining correlations between the intensity-related signals and the feature signals, but also obtaining inner products of the intensity-related signals and the feature signals.

According to the above-described structure, because correlation values between intensity-related signals that are related to the intensity of sample light, and feature signals are calculated, and a concentration of the target component is calculated using the calculated correlation values, it is possible to ascertain features of an absorption signal using fewer variables, without converting the absorption signal into an absorption spectrum, and it is also possible to measure the concentration of a target component by means of a simple calculation, without any complex spectrum calculation processing being required. For example, several hundred data points are required to be used in general spectrum fitting, however, the present invention enables concentrations to be calculated to an equivalent accuracy using at most between several correlation values and several tens of correlation values. As a result, the calculation processing load can be reduced, and a sophisticated calculation processing device is rendered unnecessary. Consequently, not only is it possible to curtail the costs of an analysis device, but a reduction in the size thereof can also be achieved.

It is desirable that the correlation value calculation unit calculate a plurality of correlation values using a number of feature signals that is equal to or greater than a number obtained by combining the number of types of target components with the number of types of interference components.

Moreover, according to the present invention, even if interference components are contained in a sample, by taking a dramatic leap forward in thinking that has not hitherto existed, namely, by changing the problem back into a direct problem by creating a linear problem based on a logarithmic operation, and then lastly by solving simultaneous equations, it is possible to reliably measure the concentration of a target component. An example of a specific structure for achieving this is described below.

It is desirable that the analysis device of the present invention be further provided with a logarithmic operation unit that performs a logarithmic operation on light intensity signals obtained by the photodetector, and that the correlation value calculation use the light intensity signals that have undergone the logarithmic operation as the intensity-related signals. At this time, it is also possible to use, as the intensity-related signals, signals obtained by removing DC components from the light intensity signals that have undergone the logarithmic operation. By employing this method, it is possible to remove the effects that occur when an offset is added to an intensity-related signal due to variations in the light intensity. Note that a similar result can be obtained by calculating the correlation values when DC components have been removed from the feature signals.

It is desirable that the analysis device of the present invention analyze target components that are in a sample containing one or a plurality of interference components, and that the analysis device be further provided with a storage unit that stores single correlation values which are correlation values per unit concentration for the target components and for the interference components, and which are determined from the respective intensity-related signals when the target components and the interference components are present singly, and from the plurality of feature signals, and that the concentration calculation unit calculate the concentrations of the target components based on the plurality of correlation values obtained by the correlation value calculation unit, and on the plurality of single correlation values.

The concentration calculation unit calculates the concentrations of the target components by solving simultaneous equations formed by the plurality of correlation values obtained by the correlation value calculation unit, the plurality of single correlation values, and the respective concentrations of the target components and the interference components. According to this type of structure, by performing a simple and reliable calculation, namely, by solving at most between several dimensions of and several tens of dimensions of simultaneous equations, it is possible to determine the concentrations of target components from which interference effects have been removed.

In order to make it possible to perform concentration determination that is less erroneous with respect to measurement noise as well, it is desirable that the correlation value calculation unit calculate the plurality of correlation values using a number of feature signals that is greater than a number obtained by combining the number of types of target components with the number of types of interference components, and that the concentration calculation unit calculate the concentration of the target components using a least-squares method from a number of dimension of simultaneous equations that is greater than a number obtained by combining the number of types of target components with the number of types of interference components.

In order to enlarge differences between correlation values obtained from the feature signals, and to improve measurement accuracy when measuring the concentrations of target components using, for example, simultaneous equations, it is desirable that there be a plurality of the feature signals, and that at least two feature signals from among the plurality of feature signals are in a mutually orthogonal relationship.

In order to improve the measurement accuracy even further, it is desirable that a reference light measurement be performed separately from the sample light measurement, and using reference correlation values, which are correlation values between the intensity-related signals of the reference light and the plurality of feature signals, that the values of sample correlation values, which are correlation values between the intensity-related signals of the sample light and the plurality of feature signals, and the values of the single correlation values be corrected.

Here, as the reference light, it is possible to use not only light that is equivalent to modulated light emitted from a light source, but light transmitted through a cell that does not contain the target component, or through a cell in which zero gas is flowing, or through a cell containing gas having a known concentration can also be used as the reference light. In addition, light obtained by splitting a part of the modulated light using a beam splitter or the like prior to the light entering the cell can also be used as the reference light.

Here, the reference light may be considered to be light that is measured either simultaneously with the sample light, slightly before or after the measurement of the sample light, or at an arbitrary timing.

Instead of correcting the sample correlation values and/or single correlation values using the reference correlation values, it is also possible to use as the intensity-related signals, an absorbance signal obtained by performing logarithmization on a ratio between the sample light and reference light.

The analysis device of the present invention can be applied when analyzing gases and the like.

An specific example of this is an analysis device in which the light source is a semiconductor laser that emits modulated light whose wavelength is modulated within a wavelength range that contains a peak in the light absorption spectrum of the target components, and there is further provided a cell into which the sample gas is introduced, and the modulated light emitted from the semiconductor laser is irradiated onto this cell, and the photodetector is disposed on an optical path of the sample light transmitted through this cell.

Moreover, a program for an analysis device according to the present invention is a program that is used in an analysis device that is equipped with a light source that emits modulated light whose wavelength is modulated relative to a central wavelength using a predetermined modulation frequency in order to analyze target components which are contained in a sample, and with a photodetector that detects an intensity of sample light obtained when the modulated light is transmitted through the sample, and that causes the analysis device to perform functions of a correlation value calculation unit that calculates correlation values between intensity-related signals that are related to the intensity of the sample light, and predetermined feature signals, and a concentration calculation unit that calculates a concentration of the target components using the correlation values obtained by the correlation value calculation unit.

Furthermore, an analysis method according to the present invention is an analysis method that analyzes target components that are contained in a sample, in which modulated light whose wavelength is modulated relative to a central wavelength using a predetermined modulation frequency is emitted, an intensity of sample light obtained when the modulated light is transmitted through the sample is detected, correlation values between intensity-related signals that are related to the intensity of the sample light, and predetermined feature signals are calculated, and concentrations of the target components are calculated using the correlation values.

Effects of the Invention

According to the above-described present invention, in an analysis device that uses light absorption, it is possible to measure the concentrations of target components by means of a simple calculation, without any complex spectrum calculation processing being required.

BEST EMBODIMENTS FOR IMPLEMENTING THE INVENTION

Hereinafter, an analysis device 100 according to an embodiment of the present invention will be described with reference to the drawings.

Figure 1:
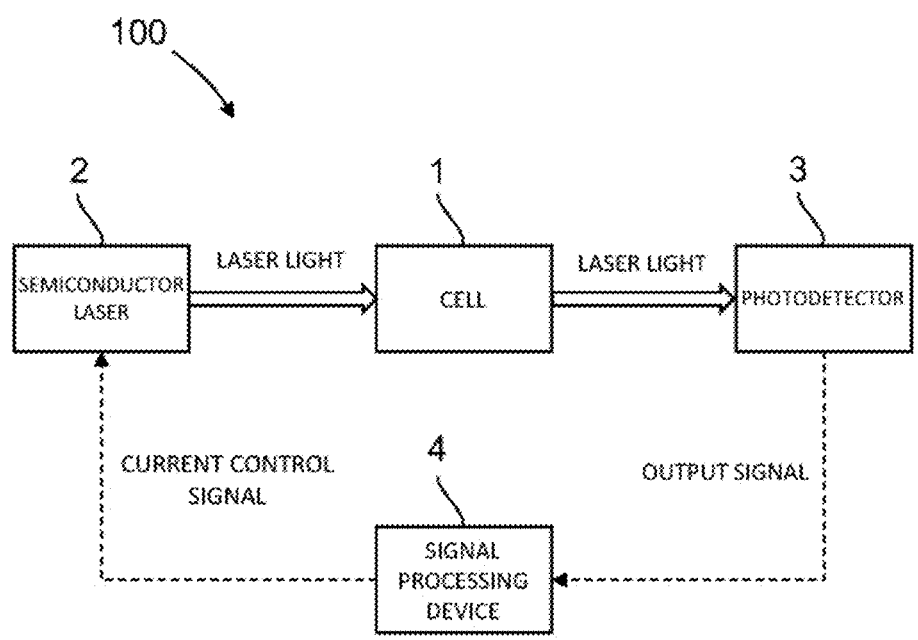
FIG. 1 is an overall schematic view of an analysis device according to an embodiment of the present invention.

An analysis device 100 of the present embodiment is a concentration measurement device that measures concentrations of target components (here, for example, CO and $CO_2$) which are contained in a sample gas such as exhaust gas, and as is shown in FIG. 1, is provided with a cell 1 into which a sample gas is introduced, a semiconductor laser 2 which serves as a light source that irradiates modulated laser light onto the cell 1, a photodetector 3 that is provided on an optical path of sample light, which is laser light that has been transmitted through the cell 1, and receives this sample light, and a signal processing device 4 that receives output signals from the photodetector 3 and, based on the values thereof, calculates the concentrations of the target components.

Each unit will now be described.

The cell 1 has an incident light aperture and a light emission aperture formed from a transparent material such as quartz, calcium fluoride, and barium fluoride that has substantially no light absorption in the absorption wavelength bands of the target components. Although not shown in the drawings, an inlet port that is used to introduce a gas into an interior thereof, and an outlet port that is used to exhaust a gas from the interior thereof are provided in the cell 1. A sample gas is introduced into the interior of the cell 1 through this inlet port.

The semiconductor laser 2 used here is a quantum cascade laser (QCL), which is one type of semiconductor laser 2, and emits mid-infrared (4~12 μm) laser light. This semiconductor laser 2 is formed such that the oscillation wavelength thereof can be modulated (i.e., changed) using a supplied current (or alternatively, voltage). Note that it is also possible for another type of laser to be used provided that the oscillation wavelength thereof is able to be varied. Moreover, it is also possible to employ a laser whose oscillation wavelength is changed by changing the temperature thereof.

The photodetector 3 that is used here is a comparatively low-cost thermal-type photodetector such as a thermopile, however, it is also possible for other types of photodetector such as, for example, quantum photovoltaic devices such as HgCdTe, InGaAs, InAsSb, and PbSe that have superior responsiveness to be used.

Figure 2:
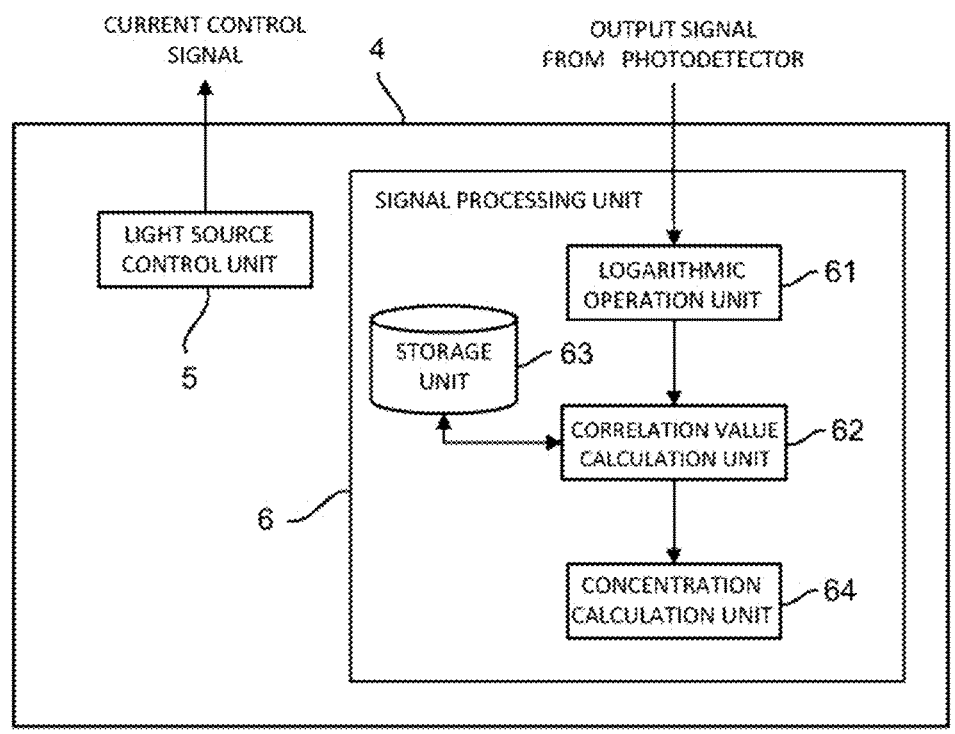
FIG. 2 is a function block diagram of a signal processing device in the same embodiment.

The signal processing device 4 is equipped with an analog electrical circuit formed by a buffer, an amplifier and the like, a digital electrical circuit formed by a CPU, memory and the like, and an AD converter and a DA converter and the like that form interfaces between these analog and digital circuits. As is shown in FIG. 2, as a result of the CPU and peripheral devices thereof operating in mutual collaboration in accordance with predetermined programs that are stored in predetermined areas of the memory, the signal processing device 4 is able to perform functions of a light source control unit 5 that controls outputs from the semiconductor laser 2, and a signal processing unit 6 that receives output signals from the photodetector 3, and then performs calculation processing on the values thereof so as to calculate concentrations of target components.

Each unit will now be described in more detail.

The light source control unit 5 controls a current source (or a voltage source) of the semiconductor laser 2 by outputting current (or voltage) control signals. More specifically, the light source control unit 5 changes the drive current (or the drive voltage) of the semiconductor laser 2 using a predetermined frequency, and thereby modulates the oscillation wavelength of the laser light output from the semiconductor laser 2 relative to a central wavelength using a predetermined frequency. As a result, the semiconductor laser 2 emits modulated light that has been modulated using a predetermined modulation frequency.

Figure 3:
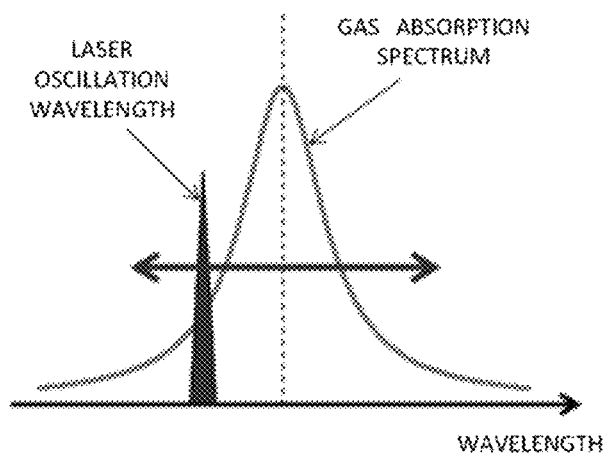
FIG. 3 is a schematic view showing a laser oscillation wavelength modulation method in the same embodiment.
Figure 4:
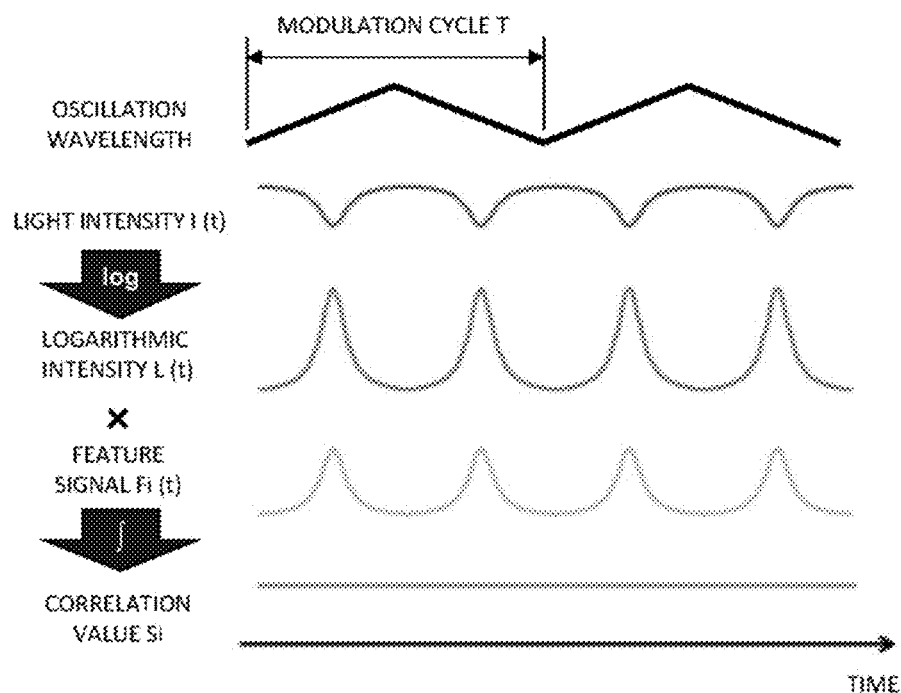
FIG. 4 is a time series graph showing an example of an oscillation wavelength, a light intensity I (t), a logarithmic intensity L (t), a feature signal $F_i$ (t), and a correlation value $S_i$ in the same embodiment.
Figure 5:
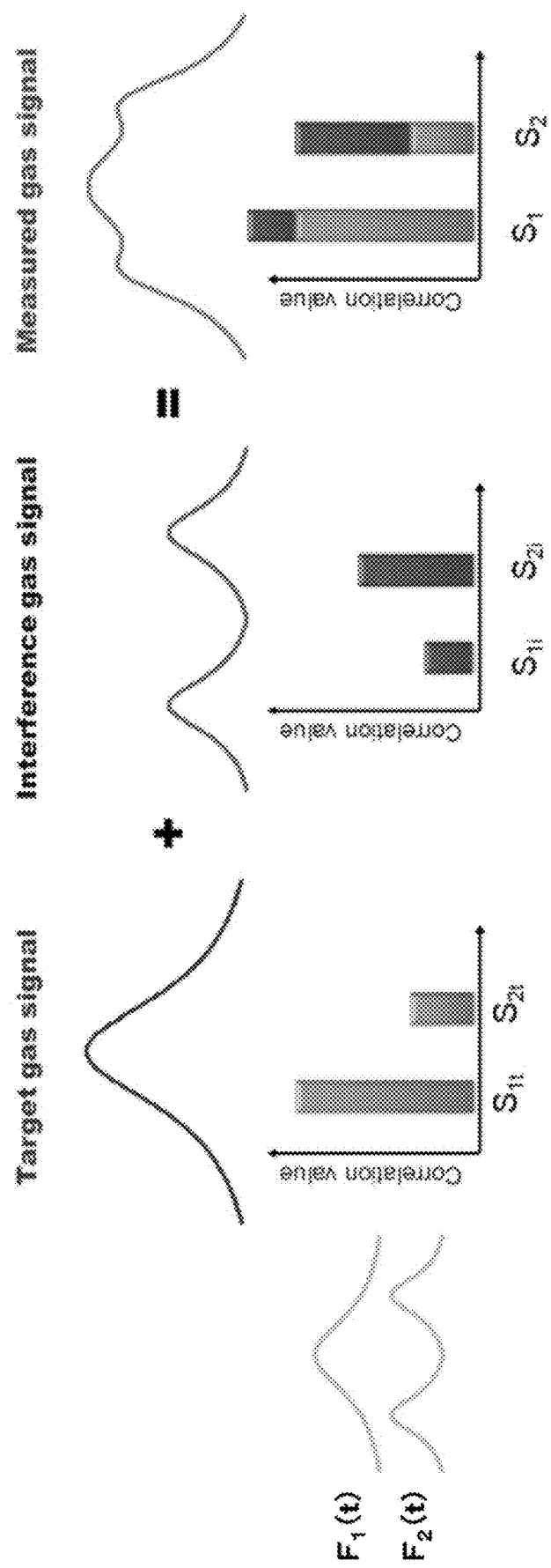
FIG. 5 is a view showing a concept diagram of a concentration calculation that uses single correlation values, and sample correlation values of the same embodiment.

In this embodiment, the light source control unit 5 changes the drive current into a triangular waveform, and modulates the oscillation wavelength into a triangular waveform (see the 'oscillation wavelength' in FIG. 4). In actual fact, the modulation of the drive current is performed using a specific function so that the oscillation wavelength is changed into a triangular waveform. In addition, as is shown in FIG. 3, the oscillation wavelength of the laser light is modulated so that a peak of the light absorption spectrum of a target component is taken as the central wavelength thereof. In addition to this, it is also possible for the light source control unit 5 to change the drive current into a sinusoidal waveform, a saw-tooth waveform, or an arbitrary functional form, and to modulate the oscillation wavelength into a sinusoidal waveform, a saw-tooth waveform, or an arbitrary functional form.

The signal processing unit 6 is formed by a logarithmic operation unit 61, a correlation value calculation unit 62, a storage unit 63, and a concentration calculation unit 64, and the like.

The logarithmic operation unit 61 performs logarithmic operations on light intensity signals, which are the signals output from the photodetector 3. A function I (t) showing changes over time in the light intensity signals obtained by the photodetector 3 takes a form shown by the 'light intensity I (t)' in FIG. 4, and as a result of a logarithmic operation being performed thereon, takes the form of the 'logarithmic operation L (t)' in FIG. 4.

The correlation value calculation unit 62 calculates respective correlation values between intensity-related signals which relate to the intensity of the sample light, and a plurality of predetermined feature signals. The feature signals are signals that are used to extract a waveform feature of the intensity-related signals by acquiring a correlation with the intensity-related signals. As these feature signals it is possible to use, for example, a sinusoidal wave signal, or various other signals that are matched to waveform features that are to be extracted from intensity-related signals.

Hereinafter, an example of when a signal other than a sinusoidal wave signal is used for the feature signal will be described. The correlation value calculation unit 62 calculates respective correlation values between an intensity-related signal relating to the intensity of the sample light, and a plurality of feature signals from which different correlations relative to those obtained from a sinusoidal wave signal (i.e., a sinusoidal function) and the intensity-related signal can be obtained. Here, the correlation value calculation unit 62 uses a light intensity signal (a logarithmic intensity L (t)) that has undergone a logarithmic operation as the intensity-related signal.

Moreover, the correlation value calculation unit 62 also calculates a plurality of sample correlation values $S_i$, which are respective correlation values between the intensity-related signals of the sample light and the plurality of feature signals, using the following Formula (1), and using a number of feature signals $F_i$ (t) (i=1, 2, . . . , n) that is greater than a number obtained by combining the number of types of target components with the number of types of interference components. Note that the symbol T in the following Formula (1) is the modulation period.

$$S_i = \int_0^T L(t) \cdot F_i(t) dt \ (i=1,2,\ldots,n)$$

$$R_i = \int_0^T L_0(t) \cdot F_i(t) dt \ (i=1,2,\ldots,n)$$

$$S_i' = S_i - R_i \quad \text{[Formula 1]}$$

When the correlation value calculation unit 62 is calculating the sample correlation values, as is shown in Formula 1, it is desirable that the correlation value calculation unit 62 calculate sample correlation values $S_i$ that have been corrected by subtracting reference correlation values $R_i$, which are correlation values between intensity-related signals $L_0$ (t) of the reference light and the plurality of feature signals $F_i$ (t), from the correlation values $S_i$ between the intensity-related signals L (t) of the sample light and the plurality of feature signals $F_i$ (t). By employing this method, any offset contained in the sample correlation values is removed, so that the correlation values become proportional to the concentrations of the target components and the interference components, and measurement errors can be reduced. Note that it is also possible to employ a structure in which the reference correlation values are not subtracted.

Here, the acquisition timing when the reference light is acquired may be either simultaneously with the sample light, slightly before or after the measurement of the sample light, or at an arbitrary timing. The reference light intensity-related signals or the reference correlation values may also be acquired in advance and stored in the storage unit 63. Moreover, the method used to acquire the reference light simultaneously with the sample light may be one in which, for example, two photodetectors 3 are provided, and the modulated light emitted from the semiconductor laser 2 is split by a beam splitter or the like, with one portion of the modulated light being used for the sample light, and the other portion being used for the reference light.

In the present embodiment, the correlation value calculation unit 62 uses a function that enables the waveform features of the logarithmic operation L (t) to be more easily ascertained than does a sinusoidal function as the plurality of feature signals $F_i$ (t). In the case of a sample gas that contains the target components and a single interference component, then using two or more feature signals $F_1$ (t), $F_2$ (t) can be considered. As these two or more feature signals $F_1$ (t), $F_2$ (t), for example, consideration may be given to using a function based on a Lorentz function which is close to the shape of the absorption spectrum, or a differential function of a function that is based on this Lorentz function. Instead of a function that is based on a Lorentz function, it is also possible to use a function that is based on a Voigt function, or a function that is based on a Gaussian function or the like as the feature signal. By using this type of function as the feature signal, larger correlation values can be obtained compared to when a sinusoidal function is used, and this enables the measurement accuracy to be improved.

Here, it is desirable that offset be adjusted so that when the DC components have been removed from the feature signals, in other words, when the feature signals are integrated in a modulation period they are equal to zero. By employing this method, it is possible to remove the effects when offset is added to an intensity-related signal due to variations in the light intensity. Note that instead of removing DC components from the feature signals, it is also possible to remove DC components from the intensity-related signals, or to remove DC components from both the feature signals and the intensity-related signals. In addition to this, as the feature signals, it is also possible to use the respective sample values of absorption signals of the target components and/or the interference components, or values that resemble these values.

Note that by making the two feature signals $F_1$ (t), $F_2$ (t) into orthogonal function sequences which are mutually orthogonal, or into function sequences that are close to being orthogonal function sequences, features of the logarithmic intensity L (t) can be extracted more efficiently, and it is possible to improve the accuracy of the concentrations obtained by the simultaneous equations (described below).

The storage unit 63 stores single correlation values which are correlation values per unit concentration for the target components and for the interference components, and which are determined from the respective intensity-related signals that exist when the target components and the interference components are present singly, and from the plurality of feature signals $F_i$ (t). The plurality of feature signals $F_i$ (t) that are used to determine these single correlation values are the same as the plurality of feature signals $F_i$ (t) that are used by the correlation calculation circuit 62.

Here, when storing the single correlation values, it is desirable that the storage unit 63 store single correlation values that have firstly undergone a correction in which the reference correlation values are subtracted from the correlation values when the target components and the interference components are present singly, so that the correlation values are converted into per unit concentrations. By employing this method, any offset contained in the single correlation values is removed, so that the correlation values become proportional to the concentrations of the target components and the interference components, and measurement errors can be reduced. Note that it is also possible to employ a structure in which the reference correlation values are not subtracted.

The concentration calculation unit 64 calculates the concentrations of the target components using the plurality of sample correlation values obtained by the correlation value calculation unit 62.

More specifically, the concentration calculation unit 64 calculates the concentrations of the target components based on the plurality of sample correlation values obtained by the correlation value calculation unit 62, and on the plurality of single correlation values stored in the storage unit 63. Still more specifically, the concentration calculation unit 64 calculates the concentrations of the target components by solving simultaneous equations formed by the plurality of sample correlation values obtained by the correlation value calculation unit 62, the plurality of single correlation values stored in the storage unit 63, and the respective concentrations of the target components and the interference components.

Next, an example of an operation of the analysis device 100 will now be described in conjunction with a detailed description of each unit. In the following description, a hypothetical case in which one target component and one interference component are contained in a sample gas is described.

[Reference Measurement]

Firstly, the light source control unit 5 controls the semiconductor laser 2, and causes the wavelength of the laser light to be modulated in a modulation frequency, and so as to be centered on a peak of an absorption spectrum of the target component. Note that, prior to performing a reference measurement using span gas, it is also possible to measure the reference correlation values by performing a reference measurement using zero gas.

Next, span gas (i.e., a gas having known component concentrations) is introduced into the cell 1 either by an operator, or automatically, and the reference measurement is performed. This reference measurement is performed both in a span gas in which the target component is present singly, and in a span gas in which the interference component is present singly.

More specifically, in the reference measurement, the logarithm operation unit 61 receives an output signal from the photodetector 3 and calculates the logarithmic intensity L (t). Next, the correlation value calculation unit 62 calculates correlation values between this logarithmic intensity L (t), and the two feature signals $F_1$ (t) and $F_2$ (t), and by then dividing a value obtained when the reference correlation value is subtracted from these correlation values by the concentration of the span gas, single correlation values, which are correlation values for each span gas per unit concentration, are calculated. Note that instead of calculating single correlation values, it is also possible to instead store relationships between a span gas concentration and the correlation values for that particular span gas.

This will now be described more specifically.

By introducing into the interior of the cell 1 a span gas in which the target component is present singly, correlation values $S_{1t}$, $S_{2t}$ of the target component are calculated by the correlation value calculation unit 62. Here, $S_{1t}$ is a correlation value with a first feature signal, while $S_{2t}$ is a correlation value with a second feature signal. Next, the correlation calculation unit 62 calculates the single correlation values $s_{1t}$, $s_{2t}$ by dividing values obtained when the reference correlation value Ri is subtracted from these correlation values $S_{1t}$, $S_{2t}$ by the span gas concentration $c_t$ of the target component. Note that the span gas concentration $c_t$ of the target component is input in advance into the signal processing unit 6 by a user.

Moreover, by also introducing into the interior of the cell 1 a span gas in which an interference component is singly present, correlation values $S_{1i}$, $S_{2i}$ of the target component are calculated by the correlation value calculation unit 62. Here, $S_{1i}$ is a correlation value with the first feature signal, while $S_{2i}$ is a correlation value with the second feature signal. Next, the correlation calculation unit 62 calculates the single correlation values $s_{1i}$, $s_{2i}$ by dividing values obtained by subtracting the reference correlation value $R_i$ from the correlation values $S_{1i}$, $S_{2i}$ by the span gas concentration $c_i$ of the interference component. Note that the span gas concentration $c_i$ of the interference component is input in advance into the signal processing unit 6 by a user.

The single correlation values $S_{1t}$, $S_{2t}$, $S_{1i}$, $S_{2i}$ calculated in the manners described above are stored in the storage unit 63. Note that these reference measurements may be performed prior to a product being shipped, or may be performed at a regular cycle.

[Sample Measurement]

The light source control unit 5 controls the semiconductor laser 2 so as to cause the wavelength of the laser light to be modulated in a modulation frequency, and so as to be centered on a peak of an absorption spectrum of the target component.

Next, sample gas is introduced into the cell 1 either by an operator, or automatically, and the sample measurement is performed.

More specifically, in the sample measurement, the logarithm operation unit 61 receives an output signal from the photodetector 3 and calculates the logarithmic intensity L (t). Next, the correlation value calculation unit 62 calculates sample correlation values $S_1$ and $S_2$ between this logarithmic intensity L (t) and the plurality of feature signals $F_1$ (t) and $F_2$ (t), and then calculates the sample correlation values $S_1'$ and $S_2'$ by subtracting the reference correlation value $R_i$ from these correlation values.

Next, the concentration calculation unit 64 solves the following binary simultaneous equations formed by the sample correlation values $S_1'$ and $S_2'$ calculated by the correlation value calculation unit 62, the single correlation values $s_{1t}$, $s_{2t}$, $s_{1i}$, $s_{2i}$ in the storage unit 63, and the respective concentrations $C_{tar}$, $C_{int}$ of the target component and the interference component.

$$s_{1t}C_{tar} + s_{1i}C_{int} = S_1'$$

$$s_{2t}C_{tar} + s_{2i}C_{int} = S_2' \quad \text{[Formula 2]}$$

As a result, by performing the simple and reliable calculation of solving the simultaneous equations of the above (Formula 2), it is possible to determine the concentration $C_{tar}$ of the target component from which interference effects have been removed.

Note that even in a case in which two or more interference components are present can be assumed, then by adding the same number of single correlation values as the number of interference components, and then solving the same number of dimension of simultaneous equations as the number types of component, it is possible, in the same way, to determine the concentration of a target component from which interference effects have been removed.

In other words, generally, if the target components t and the interference components are combined together so that n types of gases are present, then if the single correlation value of the k-th gas type in the m-th feature signal is taken as $s_{mk}$, and the concentration of the k-th gas type is taken as $C_k$, and the sample correlation value in the m-th feature signal $F_m$ (t) is taken as $S_m'$, then the following Formula (3) is established.

$$\begin{aligned} s_{11}C_1 + s_{12}C_2 + s_{13}C_3 + \ldots + s_{1n}C_n &= S_1' \\ s_{21}C_1 + s_{22}C_2 + s_{23}C_3 + \ldots + s_{2n}C_n &= S_2' \\ s_{31}C_1 + s_{32}C_2 + s_{33}C_3 + \ldots + s_{3n}C_n &= S_3' \\ &\vdots \\ s_{n1}C_1 + s_{n2}C_2 + s_{n3}C_3 + \ldots + s_{nn}C_n &= S_n' \end{aligned} \quad \text{[Formula 3]}$$

By solving the n levels of simultaneous equations (simultaneous equation with n unknowns) shown in this Formula (3), it is possible to determine the concentration of each gas of the target components and the interference components.

According to the analysis device 100 of the present embodiment which has the above-described structure, because respective correlation values $S_i$ between the logarithmic intensity L (t), which is an intensity-related signal relating to the intensity of sample light, and a plurality of feature signals $F_i$ (t) for this logarithmic intensity L (t) are calculated, and the concentration of a target component is calculated using the calculated plurality of correlation values $S_i$, it is possible to ascertain features of an absorption signal using fewer variables, without converting the absorption signal into an absorption spectrum, and it is also possible to measure the concentration of the target component via a simple calculation, without any complex spectrum calculation processing being required. For example, several hundred data points are required to be used in general spectrum fitting, however, the present invention enables concentrations to be calculated to an equivalent accuracy using at most between several correlation values and several tens of correlation values.

As a result, the calculation processing load can be reduced, and a sophisticated calculation processing device is rendered unnecessary. Consequently, not only is it possible to curtail the costs of the analysis device 100, but a reduction in the size thereof can also be achieved.

Note that the present invention is not limited to the above-described embodiment.

For example, the logarithmic operation unit 61 of the above-described embodiment performs logarithmic operations on light intensity signals from the photodetector 3, however, it is also possible for the logarithmic operation unit 61 to calculate a logarithm of a ratio between the intensity of the sample light and the intensity of the reference light (this is known as the absorbance) using the light intensity signals from the photodetector 3. At this time, the logarithmic operation unit 61 may calculate a logarithm of the intensity of the sample light, and calculate a logarithm of the intensity of the reference light, and then by subsequently subtracting these, may calculate the absorbance. Alternatively, the logarithmic operation unit 61 may determine a ratio between the intensity of the sample light and the intensity of the reference light, and then subsequently calculate the absorbance by acquiring a logarithm of this ratio.

Moreover, the correlation value calculation unit 62 of the above-described embodiment calculates correlation values between intensity-related signals and feature signals, however, it is also possible for the correlation value calculation unit 62 to calculate inner product values of the intensity-related signals and the feature signals.

Moreover in the above-described embodiment, the storage unit 63 stores single correlation values that have been corrected using reference correlation values, however, it is also possible to employ a structure in which single correlation values that have not yet been corrected are stored in the storage unit 63, and the storage unit 63 firstly subtracts the reference correlation values from the single correlation values that have not yet been corrected, and then determines single correlation values that have undergone a correction so as to be converted into per unit concentrations.

The plurality of feature signals are not limited to those in the above-described embodiment, and mutually different functions may also be used. It is also possible to use a function showing a waveform (i.e., a sample spectrum) of a light intensity, and a logarithmic intensity or an absorbance obtained, for example, by supplying span gas having a known concentration. When measuring the concentration of a single target component, it is sufficient if at least one feature signal is used.

Furthermore, using a number of types of feature signal that is greater than n, it is also possible to determine a number of single correlation values and sample correlation values that is greater than the number of types of gas, and to create a number of dimension of simultaneous equations that is greater than the number of types of gas, and to then determine the concentration of each component using the least squares method. By employing this method, a concentration determination having fewer errors relating to measurement noise becomes possible.

Here, if the target components and the interference components are combined so that the concentrations of each gas of n number of types of gas are calculated, and components are present below a predetermined threshold value in the concentrations of each of these gases, then it may also be feasible to recalculate the concentrations of each gas using gases from which these sub-threshold value components have been excluded.

Figure 6:
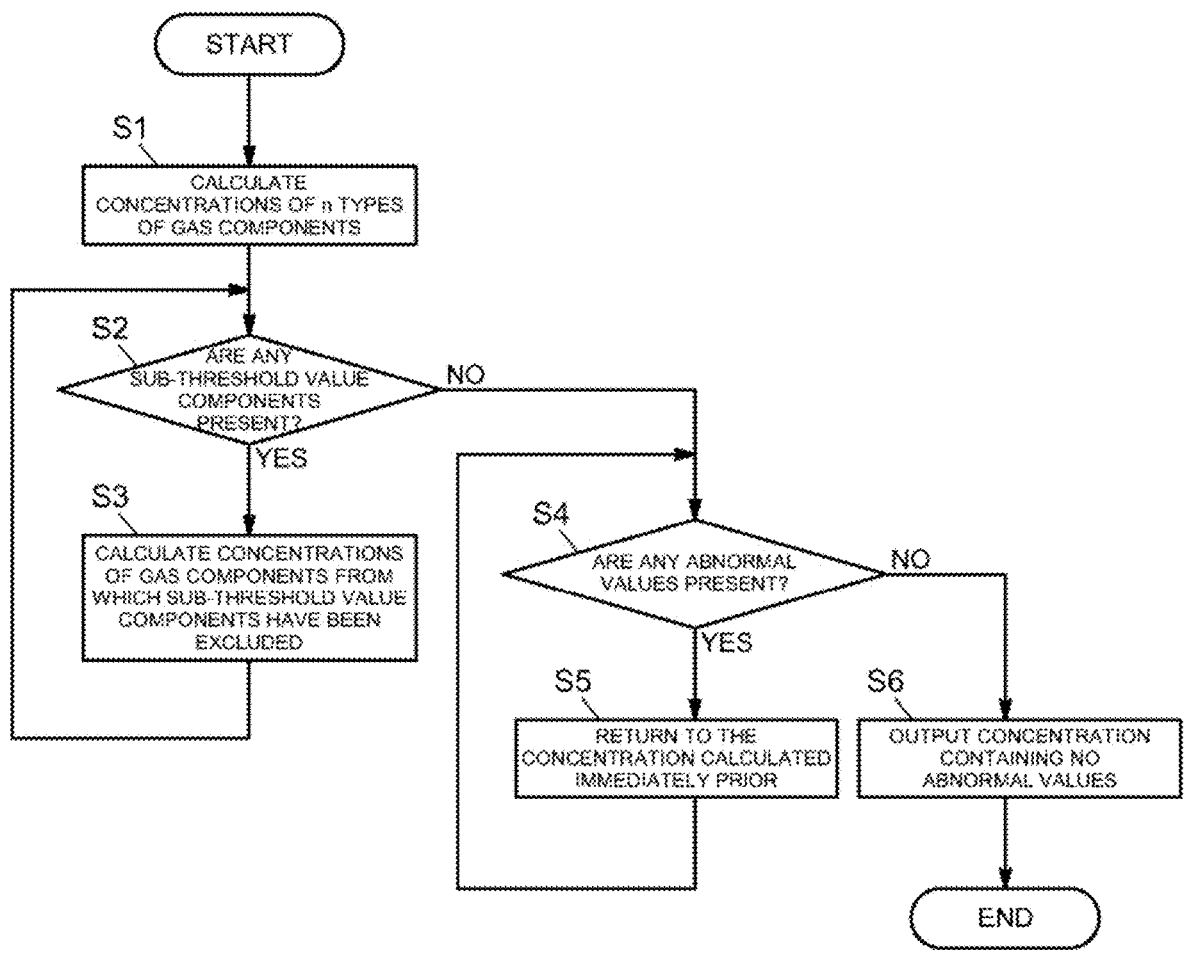
FIG. 6 is a flowchart showing a concentration calculation of a variant embodiment.

More specifically, as is shown in FIG. 6, a second calculation unit 63 calculates the concentrations of each of n number of types of gas by solving the n levels of simultaneous equations shown in the above Formula (3) (S1). Next, whether or not sub-threshold value components that are below a predetermined threshold value are contained in the concentrations of each gas is determined by a determination unit provided in the signal processing unit 6 (S2). If j number of types of sub-threshold value components are present, the concentration calculation unit 64 recalculates the concentrations of each gas of the (n–j) levels of simultaneous equations that are shown based on the same principle as that employed in the above-described Formula (3) for (n–j) number of types of gas from which these sub-threshold value components have been excluded (S3). As a result, it is possible to accurately calculate the concentrations of the types of gas that are present. These calculations of the concentration calculation of the target components may be repeated either unit a sub-threshold value component is detected, or for a predetermined number of times.

Moreover, examples of operations that may be performed if it is determined that there are no sub-threshold value components present include, for example, determining whether or not abnormal values are present in the calculated concentrations (S4). In step S4, if abnormal values are contained therein, the concentration calculation unit 64 returns to the concentrations calculated one step previously (S5), and determines whether or not abnormal values are contained in those concentrations calculated one step previously. If no abnormal values are contained therein, then those concentrations containing no abnormal values are output (S6).

Figure 7:
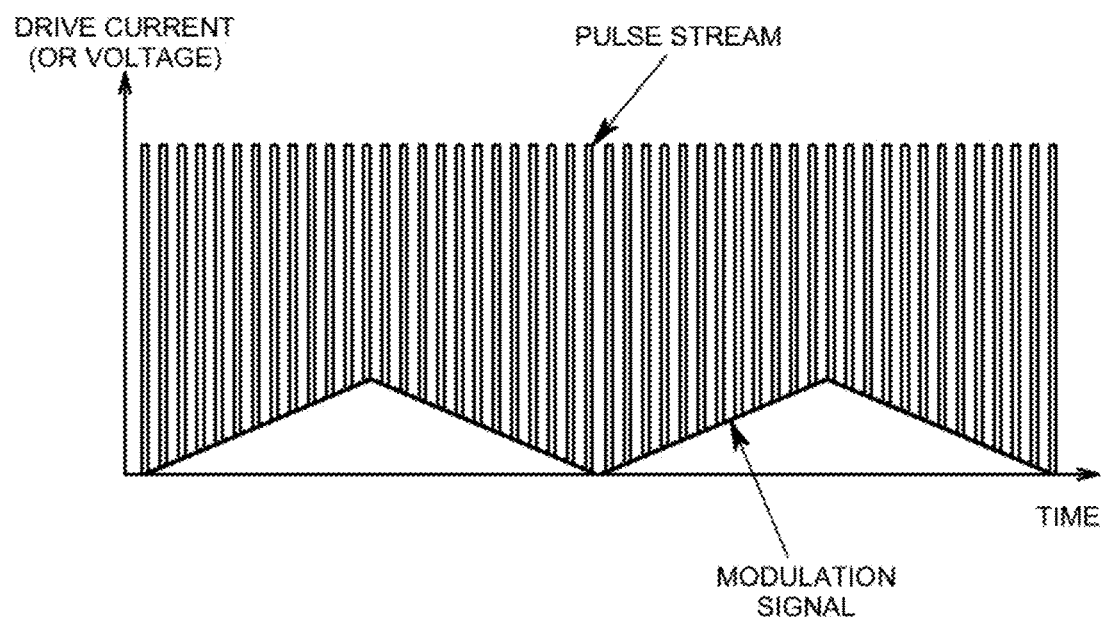
FIG. 7 is a view showing a drive current (or drive voltage) and a modulation signal in a quasi-continuous wave operation.

The light source control unit 5 of the above-described embodiment causes the semiconductor lasers to perform continuous wave (CW) operation, however, as is shown in FIG. 7, the semiconductor lasers may instead be made to perform quasi-continuous wave (quasi-CW) operation. In this case, the light source control unit 5 controls the current source (or the voltage source) of each semiconductor laser 2 by outputting current (or voltage) control signals, so as to cause the drive current (or drive voltage) of the current source (or voltage source) to be greater than a predetermined threshold value for generating pulse oscillations. More specifically, the light source control unit 5 generates quasi-CW operation with pulse oscillations having a predetermined pulse width (for example, 10~50 ns. Duty ratio 5%) that are repeated at a predetermined cycle (for example, 1~5 MHz). The light source control unit 5 also performs sweeping of the oscillation wavelength of the laser light by generating temperature changes by changing the drive current (or drive voltage) of the current source (or voltage source) in a predetermined frequency using wavelength sweeping values which are less than the threshold value for the pulse oscillation. The modulation signals used to modulate the drive current change in either a triangular waveform, a saw-tooth waveform, or a sinusoidal waveform, and the frequency thereof is, for example, between 1 and 100 Hz.

Figure 8:
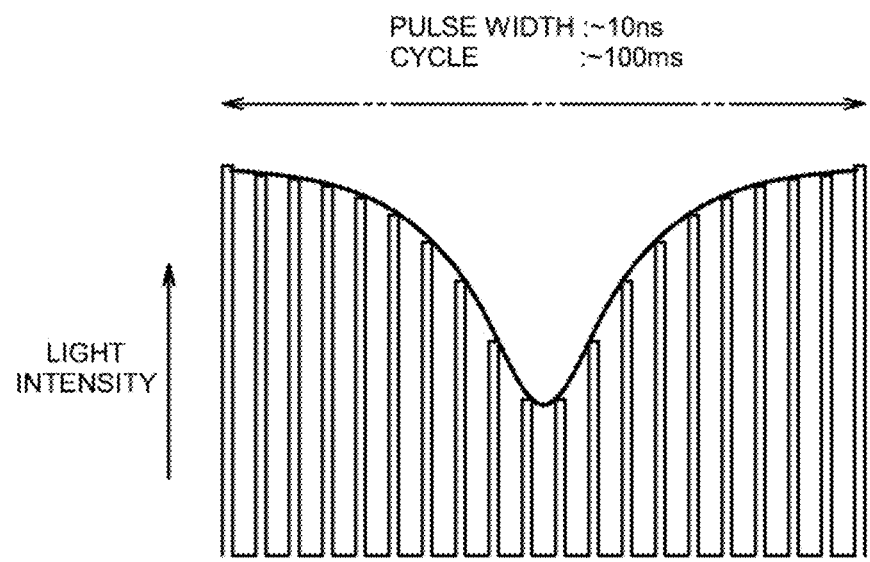
FIG. 8 is a schematic view showing a measurement principle based on quasi-continuous wave operation.

The optical intensity signal obtained by the photodetector 3 by causing the semiconductor lasers to generate a quasi-CW operation in this way has the form shown in FIG. 8. In this way, it is possible to acquire an absorption spectrum using the entire pulse stream. Compared to a CW operation, a quasi-CW operation consumes less power from the light source, and waste heat processing thereof is also simplified, so that the lifespan of the light source can be further prolonged.

Figure 9:
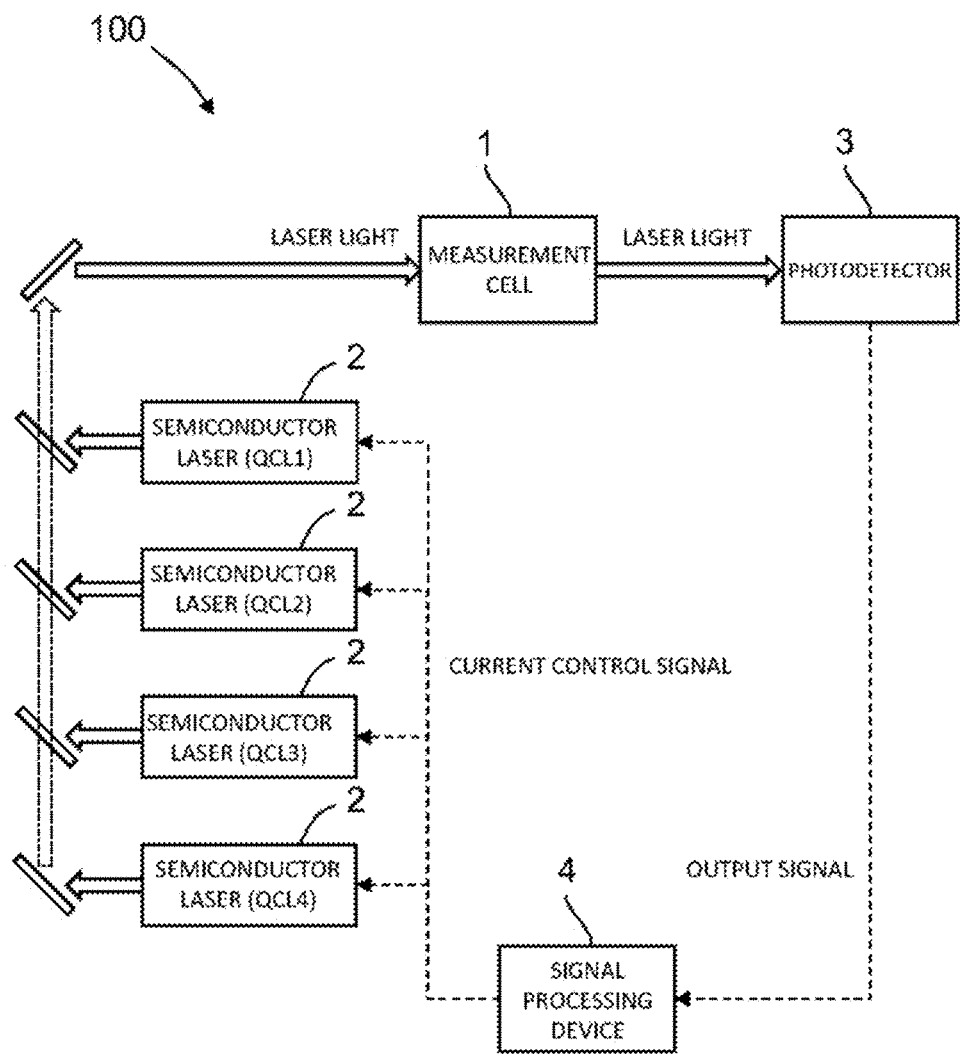
FIG. 9 is an overall schematic view of an analysis device according to a variant embodiment.
Figure 10:
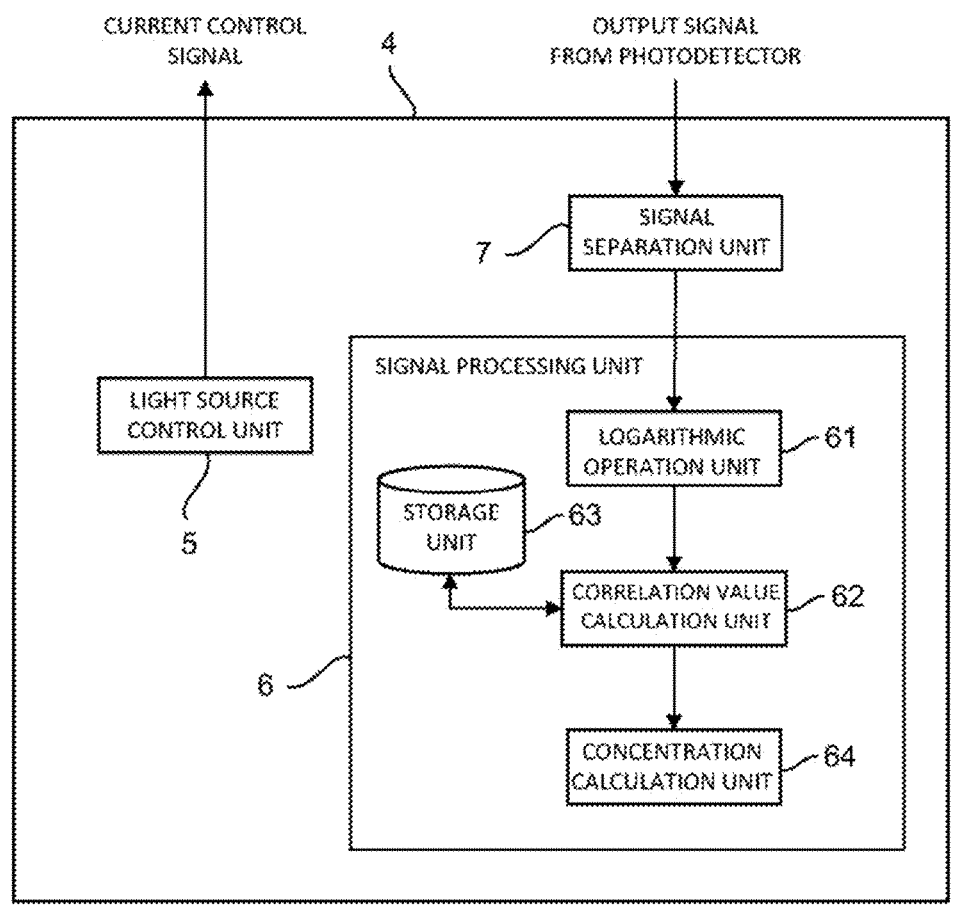
FIG. 10 is a function block diagram of a signal processing device in a variant embodiment.

Moreover, as is shown in FIG. 9, it is also possible for the analysis device 100 to be provided with a plurality of semiconductor lasers 2 which are light sources that irradiate laser light into the cell 1. In this analysis device 100, as is shown in FIG. 10, the signal processing device 4 performs the functions of the light source control unit 5 that controls outputs from the semiconductor lasers 2, a signal separation unit 7 that separates the signals from each semiconductor laser 2 from the light intensity signals obtained by the photodetector 3, and a signal processing unit 6 that receives the signals from each semiconductor laser 2 that have been separated by the signal separation unit 7, and then performs calculation processing on the values thereof so as to calculate concentrations of target components.

The light source control unit 5 causes each of the plurality of semiconductor lasers 2 to generate a pulse oscillation, and also modulates the oscillation wavelength of the laser light using a predetermined frequency. In addition, the light source control unit 5 performs control such that the plurality of semiconductor lasers 2 each have an oscillation wavelength that corresponds to a mutually different target component, and generates pulse oscillations that have the same oscillation frequency as each other, but have mutually different oscillation timings from each other.

More specifically, the light source control unit 5 controls the current source (or the voltage source) of the semiconductor lasers 2 by outputting current (or voltage) control signals. As is shown in FIG. 7, the light source control unit 5 of the present embodiment causes the respective semiconductor lasers 2 to generate quasi-CW operation with pulse oscillations having a predetermined pulse width (for example, 10~100 ns. Duty ratio 5%) and which are repeated at a predetermined cycle (for example, 0.5~5 MHz).

Moreover, as is shown in FIG. 7, the light source control unit 5 performs sweeping of the oscillation wavelength of the laser light by generating temperature changes by changing the drive current (or drive voltage) of the current source (or voltage source) in a predetermined frequency. As is shown in FIG. 3, the oscillation wavelength of the laser light in each semiconductor laser is modulated so as to be centered on peaks of the light absorption spectrum of the target components. The modulation signals used to change the drive current change in either a triangular waveform, a saw-tooth waveform, or a sinusoidal waveform, and the frequency thereof is, for example, between 100 Hz and 10 kHz. Note that, in FIG. 7, an example is shown in which the modulation signal changes in a triangular waveform.

The optical intensity signal obtained by the photodetector 3 by causing a single semiconductor laser 2 to generate a quasi-CW operation in this way has the form shown in FIG. 8. In this way, it is possible to acquire an absorption spectrum using the entire pulse stream.

Figure 11:
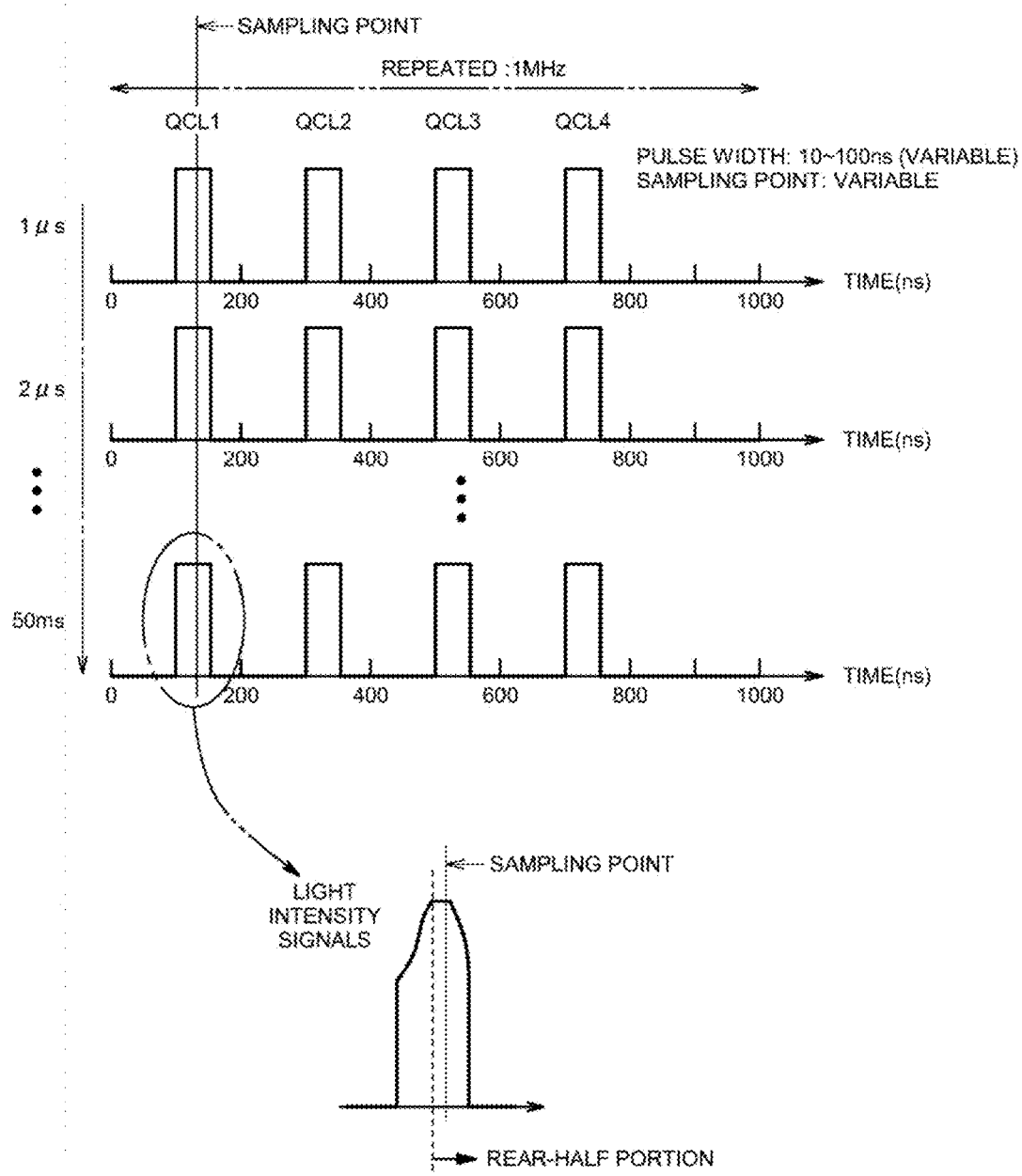
FIG. 11 is a schematic view showing an example of pulse oscillation timings and light intensity signals of a plurality of semiconductor lasers in a variant embodiment.

In addition, the light source control unit 5 causes the plurality of semiconductor lasers 2 to generate pulse oscillations at mutually different timings from each other. More specifically, as is shown in FIG. 11, the plurality of semiconductor lasers 2 sequentially generate pulse oscillations such that one pulse of each of the other semiconductor lasers 2 is contained within one cycle of the pulse oscillations of one semiconductor laser 2. In other words, one pulse of each of the other semiconductor lasers 2 is contained within the mutually adjacent pulses of one semiconductor laser 2. At this time, the pulses of a plurality of the semiconductor lasers 2 are oscillated so as to not overlap with each other.

Figure 12:
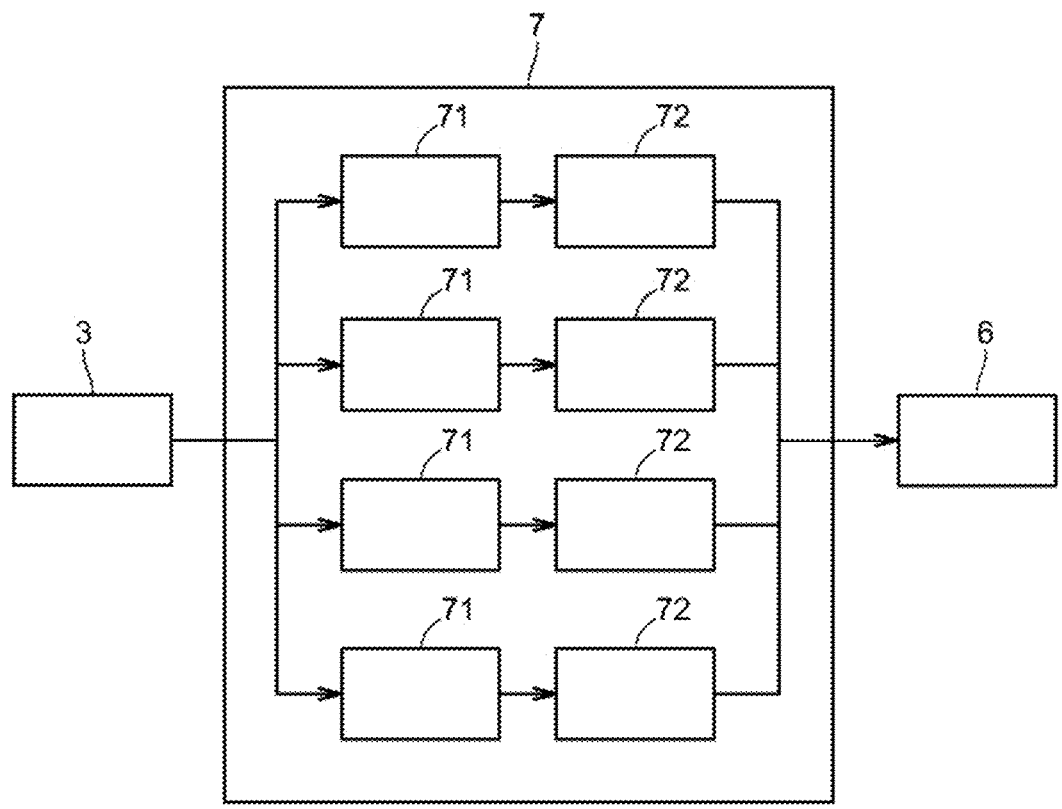
FIG. 12 is a schematic view showing a structure of a signal separation unit of a variant embodiment.

The signal separation unit 7 separates the respective signals from each of the plurality of semiconductor laser 2 from the light intensity signals obtained by the photodetector 3. As is shown in FIG. 12, the signal separation unit 7 of the present embodiment has a plurality of sample and hold circuits that are provided so as to individually correspond to each of the plurality of semiconductor lasers 2, and A/D converters 72 that convert the light intensity signals separated by the relevant sample and hold circuit 71 into digital signals. Note that the sample and hold circuits 71 and the A/D converters 72 may instead be formed by a single one of each that is used commonly by the plurality of semiconductor lasers 2.

Figure 13:
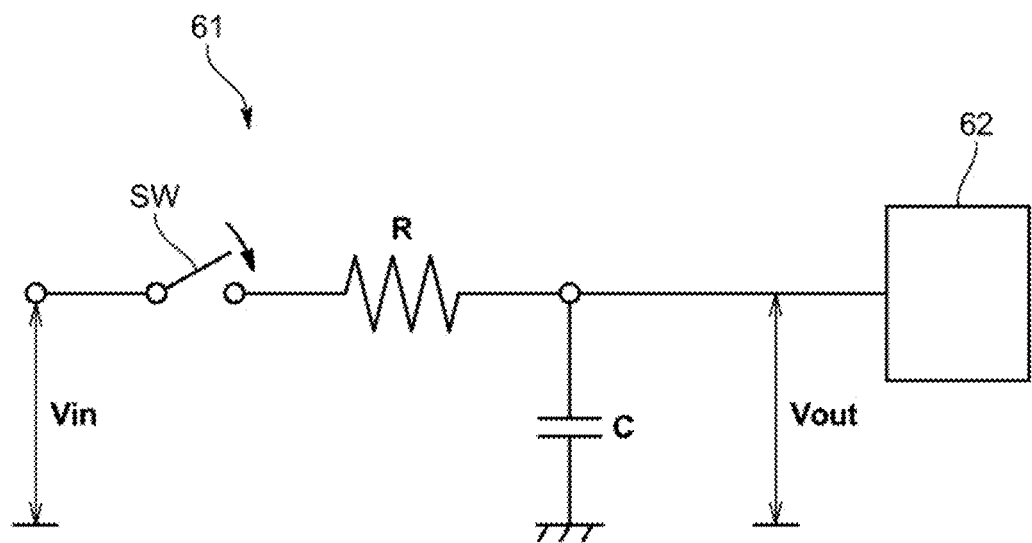
FIG. 13 is a view showing an example of a sample and hold circuit of a variant embodiment.

The sample and hold circuits 71 separate and hold the signal of the corresponding semiconductor laser 2 from the light intensity signals of the photodetector 3 using sampling signals that have been synchronized with the current (or voltage) control signals of the corresponding semiconductor laser 2, at timings that have been synchronized with the timings of the pulse oscillations of the semiconductor lasers 2. An example of a sample and hold circuit 71 is shown in FIG. 13, however, the present invention is not limited to this structure. Here, a structure is employed in which the sample and hold circuits 71 separate and hold the signal corresponding to the rear-half portion of the pulse oscillations of the semiconductor lasers 2. More specifically, signals that correspond to the rear-half portion of the pulse oscillations are held so that the ON/OFF timings of a switch SW of each sample and hold circuit 71 are in synchronization with the timing of the pulse oscillation of the semiconductor laser 2. In addition, as is shown in FIG. 11, the sample and hold circuits 71 separate the signals at a predetermined sampling point within this rear-half portion (for example, at a point between 80 and 90 ns). A single light absorption signal can be created by collecting the plurality of signals from each semiconductor laser 2 that have been separated by this signal separation unit 7, and it is thereby possible to obtain a light absorption signal having better wavelength resolution than a light absorption signal obtained when a single semiconductor laser 2 is made to generated a quasi-CW operation. Here, because the absorption change position within the pulse is changed by the modulation signal, a waveform can be reproduced by collecting signals at the same timings relative to the pulse oscillations. Moreover, because a signal corresponding to a portion of a pulse oscillation is separated by each sample and hold circuit 71, an A/D converter having a slow processing speed may be used as the A/D converter 72. It is also possible for time-averaging to be performed on the plurality of light absorption signals obtained from each of the respective semiconductor lasers 2 before these signals are used.

Using the light absorption signals of each semiconductor laser 2 which have been separated by the signal separator 7 in this way, the signal processing unit 6 calculates the concentration of the target component that corresponds to each semiconductor laser 2. Note that this calculation of the concentration of the target component by the signal processing unit 6 is performed in the same way as in the above-described embodiment.

Moreover, the sample gas is not limited to being exhaust gas, and may also be air or the like, or may be a liquid or a solid. In the same vein, the target component is also not limited to being a gas, and the present invention can also be applied when the target component is a liquid or a solid. Furthermore, the present invention is not limited to an analysis using a transmitted light through an object being measured, and may also be applied to an analysis using a reflected light.

The light source is also not limited to being a semiconductor laser, and another type of laser may instead be used. Additionally, any type of light source may be used provided that the light source is a single wavelength light source having a sufficient linewidth to secure measurement accuracy, and is able to undergo wavelength moderation. The light source may also be one that is able to undergo intensity modulation.

Furthermore, it should be understood that the present invention is not limited to the above-described embodiments, and that various modifications and the like may be made thereto insofar as they do not depart from the spirit or scope of the present invention.

DESCRIPTION OF THE REFERENCE NUMERALS

100 . . . Analysis Device
1 . . . Cell
2 . . . Light Source (Semiconductor Laser)
3 . . . Photodetector
61 . . . Logarithmic Operation Unit
62 . . . Correlation Value Calculation Unit
63 . . . Storage Unit
64 . . . Concentration Calculation Unit

What is claimed is:

1. An analysis device that analyzes a target component which is contained in a sample containing one or more interference components whose interference effects are to be removed, comprising:
   a light source that emits modulated light whose wavelength is modulated using a predetermined modulation frequency;
   a photodetector that detects an intensity of sample light obtained when the modulated light is transmitted through the sample;
   a correlation value calculation unit that calculates sample correlation values, which are correlation values between intensity-related signals that are related to the intensity of the sample light and predetermined feature signals, using a number of the predetermined feature signals that is equal to or greater than a number obtained by combining a number of types of target components with a number of types of the one or more interference components; and
   a concentration calculation unit that calculates a concentration of the target component from which interference effects based on the one or more interference components have been removed using the sample correlation values obtained by the correlation value calculation unit.

2. The analysis device according to claim 1, wherein the analysis device further comprises a logarithmic operation unit that performs a logarithmic operation on light intensity signals obtained by the photodetector, and the correlation value calculation unit uses light intensity signals that have undergone the logarithmic operation as the intensity-related signals.

3. The analysis device according to claim 1, wherein the intensity-related signals are absorbance signals obtained by performing logarithmization on a ratio between the sample light and reference light which provides a reference.

4. The analysis device according to claim 2, wherein the correlation value calculation unit corrects the sample correlation values using reference correlation values, which are correlation values between the intensity-related signals of reference light that provides a reference and the predetermined feature signals.

5. The analysis device according to claim 4, wherein the reference light is light that is measured either simultaneously with the sample light, slightly before or after the measurement of the sample light, or at an arbitrary timing.

6. The analysis device according to claim 1, wherein at least two of the predetermined feature signals are in a mutually orthogonal relationship.

7. The analysis device according to claim 1, wherein
   the analysis device further comprises a storage unit that stores single correlation values which are correlation values per unit concentration for the respective target components and one or more interference components, and which are determined from the respective intensity-related signals when the target components and the one or more interference components are present singly, and from the predetermined feature signals, and
   the concentration calculation unit calculates the concentrations of the target components based on the sample correlation values obtained by the correlation value calculation unit, and on the single correlation values.

8. The analysis device according to claim 4, wherein
   the analysis device analyzes target components that are in a sample containing the one or more interference components,
   and the analysis device further comprises a storage unit that stores single correlation values which are correlation values per unit concentration for the respective target components and one or more interference components, and which are determined from the respective intensity-related signals when the target components and the one or more interference components are present singly, and from the predetermined feature signals,
   and the concentration calculation unit calculates the concentrations of the target components based on the sample correlation values obtained by the correlation value calculation unit, and on the single correlation values, and
   the storage unit stores single correlation values that have been corrected using the reference correlation values.

9. The analysis device according to claim 7, wherein the concentration calculation unit calculates the concentrations of the target components by solving simultaneous equations formed by the sample correlation values obtained by the correlation value calculation unit, the single correlation values, and the respective concentrations of the target components and the one or more interference components.

10. The analysis device according to claim 9, wherein the concentration calculation unit calculates the concentration of the target components using a least-squares method from a number of dimension of simultaneous equations that is greater than the number obtained by combining the number of types of target components with the number of types of the one or more interference components.

11. The analysis device according to claim 1, wherein
the target components are contained in a sample gas such as exhaust gas, and
the light source is a semiconductor laser that emits modulated light whose wavelength is modulated in a wavelength range that contains a peak in the light absorption spectrum of the target components, and
there is further provided a cell into which the sample gas is introduced, and
the modulated light emitted from the semiconductor laser is irradiated onto this cell, and the photodetector is disposed on an optical path of the sample light transmitted through this cell.

12. A computer readable media that stores a program for an analysis device that is used in an analysis device that is equipped with a light source that emits modulated light whose wavelength is modulated relative to a central wavelength in a predetermined modulation frequency in order to analyze a target component which is contained in a sample containing one or more interference components whose interference effects are to be removed, and with a photodetector that detects an intensity of sample light obtained when the modulated light is transmitted through the sample, and that causes the analysis device to perform functions of:
a correlation value calculation unit that calculates sample correlation values, which are correlation values between intensity-related signals that are related to the intensity of the sample light and predetermined feature signals, using a number of the predetermined feature signals that is equal to or greater than a number obtained by combining a number of types of target components with a number of types of the one or more interference components; and
a concentration calculation unit that calculates a concentration of the target component from which interference effects based on the one or more interference components have been removed using the sample correlation values obtained by the correlation value calculation unit.

13. An analysis method that is used to analyze target components that are contained in a sample containing one or more interference components whose interference effects are to be removed, in which:
modulated light whose wavelength is modulated relative to a central wavelength in a predetermined modulation frequency is emitted;
an intensity of sample light obtained when the modulated light is transmitted through the sample is detected;
sample correlation values, which are correlation values respectively of a number of predetermined feature signals which is a number obtained by combining a number of types of the target components with a number of types of the one or more interference components, and intensity-related signals which are related to the intensity of the sample light are calculated; and
concentrations of the target components from which interference effects based on the one or more interference components have been removed are calculated using the sample correlation values.

* * * * *